May 5, 1964 A. MARCHETTI 3,131,801
VERTICAL TYPE ENDLESS CONVEYOR
Filed April 3, 1961 6 Sheets-Sheet 1

Inventor
Augusto Marchetti

By Stevens Davis Miller & Mosher
Attorneys

May 5, 1964  A. MARCHETTI  3,131,801
VERTICAL TYPE ENDLESS CONVEYOR
Filed April 3, 1961  6 Sheets-Sheet 2

Inventor
Augusto Marchetti
By Stevens Davis Miller & Mosher
Attorneys

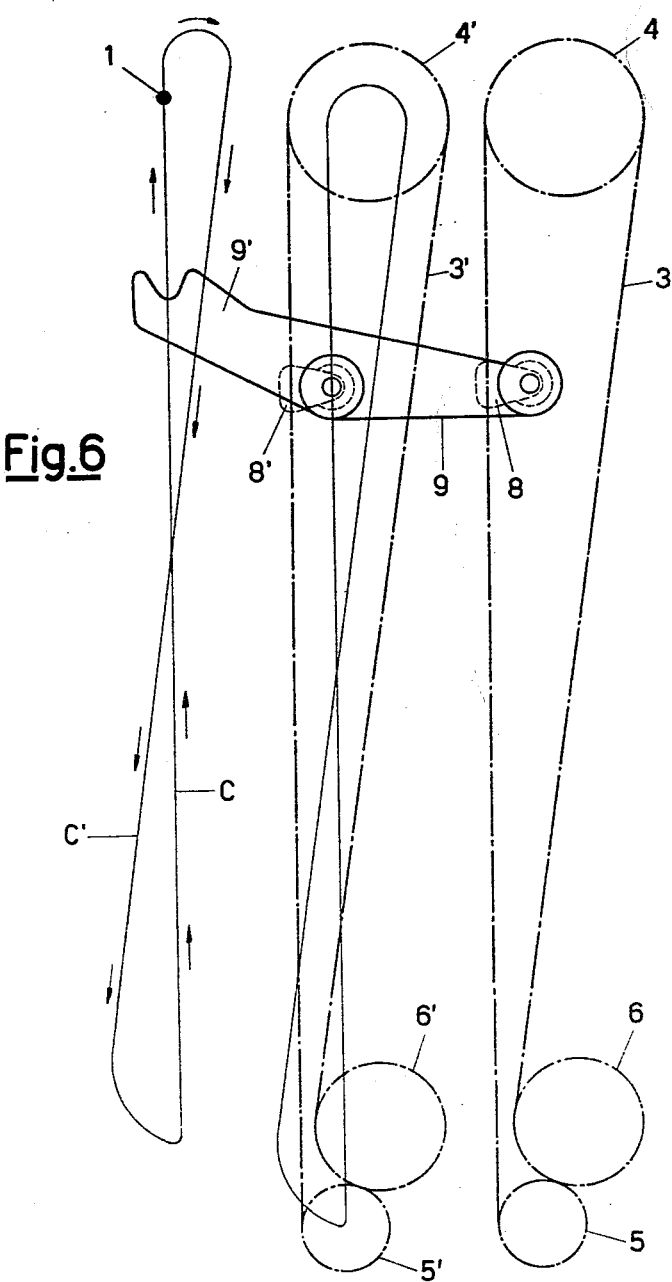

May 5, 1964  A. MARCHETTI  3,131,801
VERTICAL TYPE ENDLESS CONVEYOR
Filed April 3, 1961  6 Sheets-Sheet 4
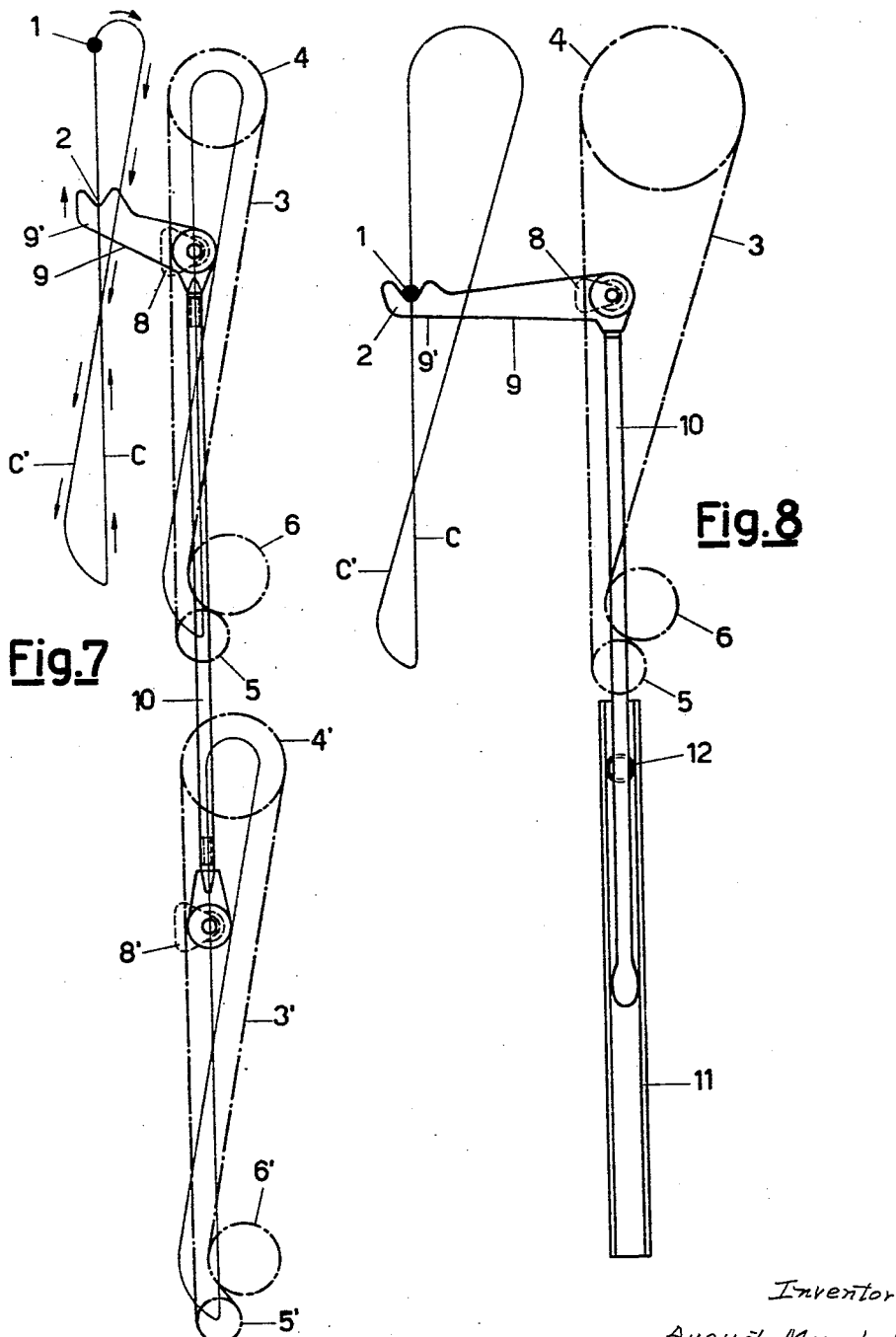
Inventor
Augusto Marchetti
By Stevens Davis Miller & Mosher
Attorneys

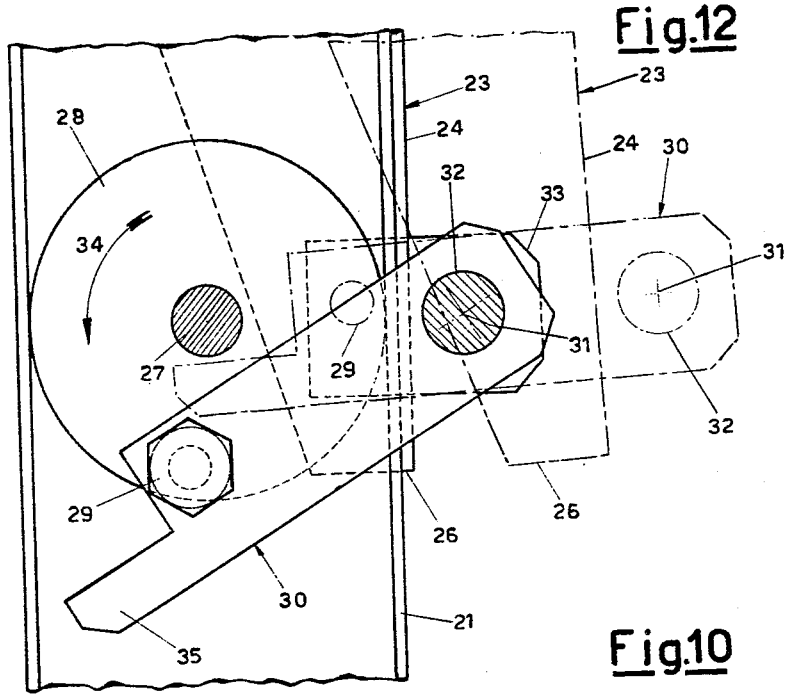
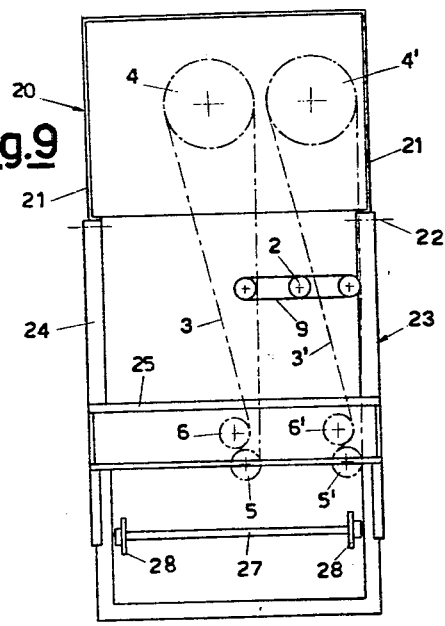
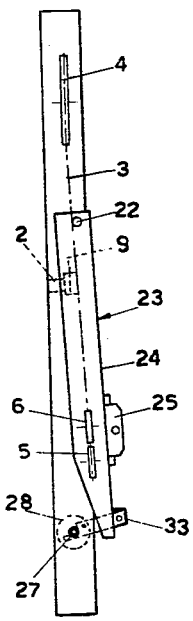

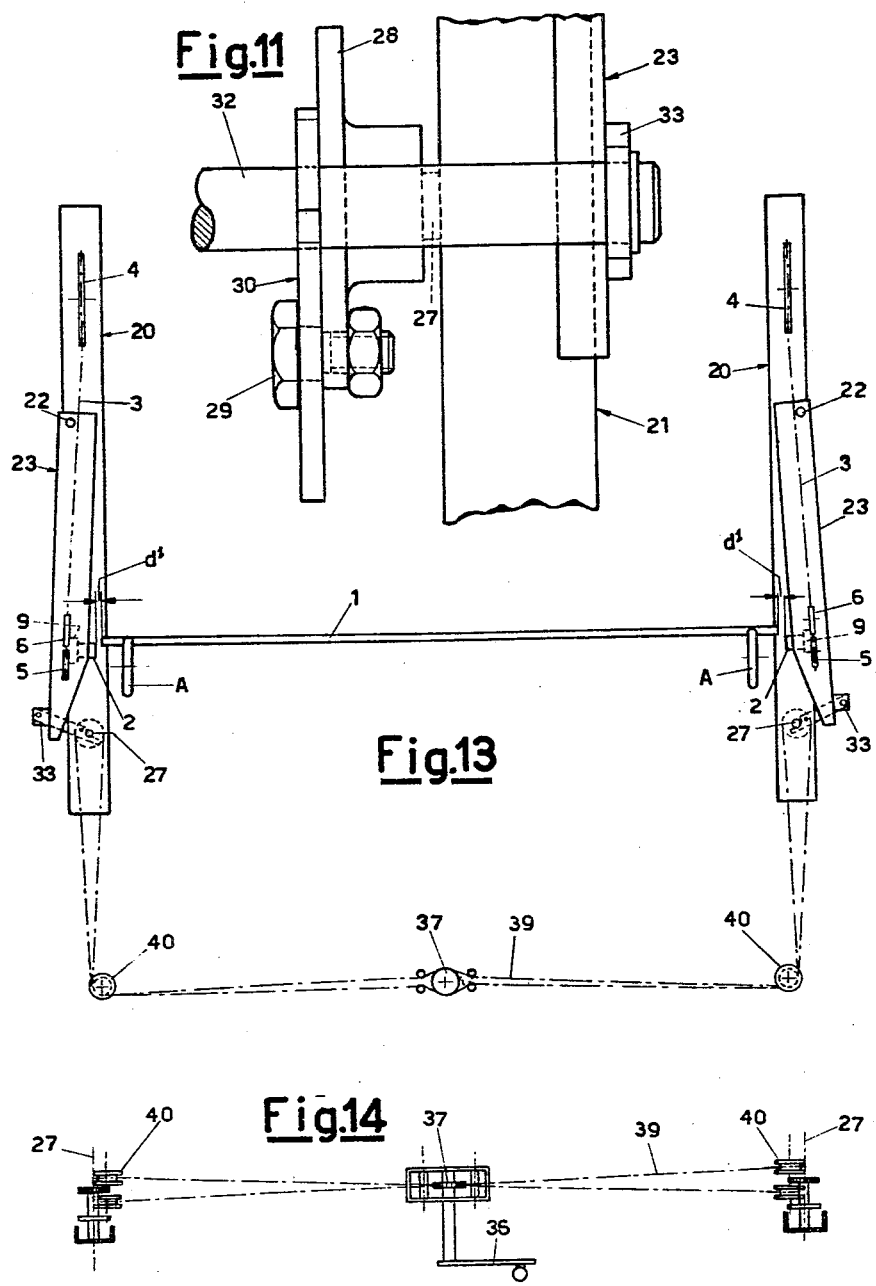

United States Patent Office 3,131,801
Patented May 5, 1964

3,131,801
VERTICAL TYPE ENDLESS CONVEYOR
Augusto Marchetti, Milan, Italy, assignor to
Gebrueder Buehler, Uzwil, Switzerland
Filed Apr. 3, 1961, Ser. No. 100,193
Claims priority, application Italy Apr. 9, 1960
2 Claims. (Cl. 198—20)

The object of the present invention is to provide, by means of a conveyor which moves continuously around a closed circuit, for the shifting along a plane of objects spaced apart at relatively small intervals, and the raising of said objects from said plane to a plane situated on a different level.

Such a conveying system is necessary, for example, in drying plants for edible pastes, wherein a plurality of conveying devices, each formed of a pair of chains, carries the sticks or canes which support the long strings of paste, from one end to the other of the drying chamber; each stick, on reaching the end of the travel determined by the pair of chains, must be shifted on to another conveyor, which is also formed of a pair of chains, on a higher or lower level than the preceding conveyor, so that it can complete a similar travel along the drying chamber in the opposite direction.

The nature of this invention and some ways of putting it into practice will now by described with reference to the accompanying drawings wherein:

FIGS. 5, 5a, 6, 7 and 8 show schematic views of other embodiments of the invention.

FIGURES 9 to 14 show some variants relating to an embodiment of the invention in which a mechanism is provided for the purpose of disconnecting the elevating device of one of the conveyors while still keeping all the other parts of the machine in movement, more precisely:

FIG. 9 shows a side elevation view of a main frame of the machine containing the device according to the invention (taken for the purpose of the example in the form of embodiment shown in FIG. 5) and an auxiliary swinging frame thereof.

FIG. 10 shows the side of the swinging frame, that is in a front view parallel to the conveyor of the machine to which the device is attached.

FIGS. 11 and 12 are detailed views, on an enlarged scale, of the drive mechanism of the swinging member, from the front and the side respectively; while FIGS. 13 and 14 are schematic views, respectively in front elevation and plan, of a pair of frames as illustrated in FIGS. 9 and 10 as mounted laterally on a conveyor in FIG. 14, said conveyor not being shown for the sake of clarity.

Figure 1:
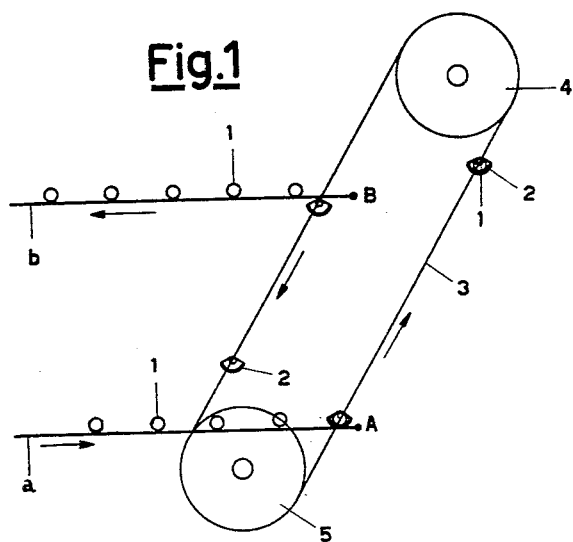
FIG. 1 shows schematically the position of the conveyed objects and a known device for shifting them from one level to another.

In FIG. 1 are shown the objects 1 which move along the carrier lines $a$ and $b$ under impulsion from means which are not shown. When they reach end A of the carrier line $a$, the objects 1 are taken one at a time by a cradle 2 attached to a link of the endless chain 3 which winds round the wheels 4 and 5, one of which is the driving wheel. The cradle 2 lifts the object 1 with which it comes into engagement and after passing round wheel 4 places said object on the carrier line $b$ in the vicinity of point B, so that the object resumes its movement in the opposite direction under the impulsion of like propelling means which are not shown.

If now the motion of chain 3 is reversed, and the directions in which the objects 1 are conveyed along the lines $a$ and $b$ are also reversed, then the objects are lifted from the carrier line $b$ and deposited on the carrier line $a$.

It is easy to see that in a device for shifting objects 1 from carrier $a$ to carrier $b$ or vice versa, however chain 3 is arranged, cradle 2 is obliged to cross twice either line $a$ or line $b$ or both. In the second of the aforesaid crossings cradle 2 must not interfere with any of the objects 1, and this is possible only if the objects 1 are sufficiently spaced apart, having regard to the dimensions of cradle 2, possible swinging of chain 3 and a reasonable safety margin.

But in the aforesaid type of conveying device it is advantageous for the objects 1 to be as near as possible to each other; taking as an example the case of sticks used for sustaining food paste in a drying plant: since there must be a minimum distance between the two ends of the strings of paste strung on the sticks, it is advantageous for about the same distance to be kept between the ends of paste strings strung on adjacent sticks, which amounts to saying that the net distance separating the two sticks should be very little greater than the diameter of the stick themselves. It is manifest that under these circumtances it would not be possible to apply a device such as that shown schematically in FIG. 1.

Figure 2:
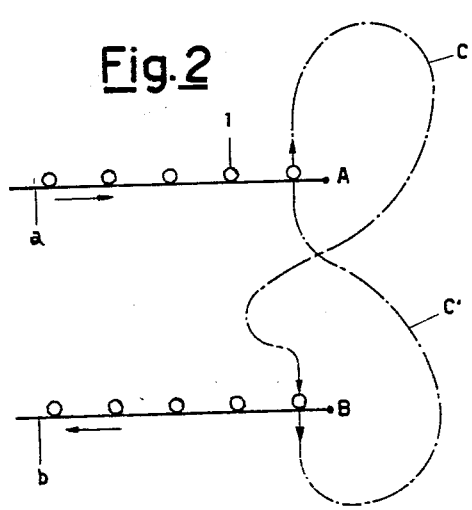
FIG. 2 shows schematically the path which said objects follow, according to the present invention, when being shifed from one level to another.

In FIG. 2 the carrier lines $a$ and $b$ with objects 1 are again shown, and the broken line $c$ represents any imaginary path which it is desired to make one of the objects 1 follow in order to shift it from a point on the line $a$ near point A to a point on line $b$ near point B.

Considering FIG. 2, it will be understood that any path, such as for example that indicated by $c'$, which returns from the second of the aforesaid points to the first and does not cross either line $a$ or line $b$, must cross the path $c$ hereinbefore mentioned.

Therefore the problem which is to be solved by the present invention is that of shifting an object from a point near to the end of a carrier line and depositing it at a point near to the end of another carrier line on a different level, by means of a mobile conveying means which travels along a path crossing each of said carrier lines once only.

According to the present invention, this problem is resolved by causing said continuously moving conveying means to follow a self-intersecting path.

Such a plane self-intersecting path may be achieved by means of various types of mechanisms. The invention, however, provides for the use of a chain or similar equivalent flexible means for this purpose, which chain is carried on at least two substantially vertical coplanar wheels; if a length of said chain carries said conveying means connected thereto in outwardly extending relationship such that said means projects outwardly in the same plane as said wheels to an extent which is greater than half the smallest dimension of the area enclosed by said flexible means, then said conveying means describes a self-intersecting line which can be made to assume the most suitable shape for the purpose in hand.

If, for example, three coplanar wheels are provided and arranged in such a way that the tangent to one of the branches of the flexible means (or the prolongation thereof) crosses the other branch, then said flexible means will take on a concave shape and consequently the sustaining means will, as desired, follow a self-intersecting path.

Figure 3:
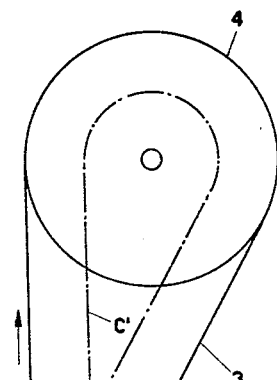
FIG. 3 shows a view of a device according to the invention.
Figure 4:
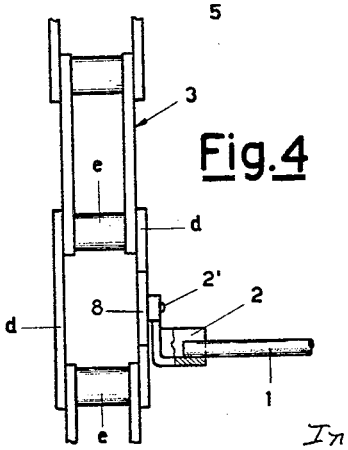
FIG. 4 shows a view of FIG. 3 along the directional line IV.

In order better to explain this embodiment of the invention, reference will now be made to FIGURES 3 and 4.

In these figures the pulleys 4 and 5 for the chain 3 will be noted, and it will also be noted that one branch of the chain is brought, by means of the auxiliary wheel 6, to a minimum distance 7 from the other branch.

Now if the sustaining means 2 is joined integrally to said chain 3 with a projection 8 which, in accordance with what has hereinbefore been described, is greater than the half of said minimum distance 7, then said means 2 will follow the self-intersecting line c—c' according to the invention.

In an embodiment which might in practice be constructed (see FIG. 4) there is an outwardly projecting means 8 joined integrally to a plate d which, together with the further plate d parallel to the first said plate, and the rollers e, makes up a link of the chain 3. The cradle or sustaining means 2 for the object 1 hangs freely from and is swivellably connected to the overhanging means 8, by means, for example, of a stud 2'. On account of the weight of the object 1, the cradle 2 will tend to be kept low with its opening facing upwards.

FIGS. 5, 5a, 6, 7 and 8, as already mentioned, relate to other embodiments of the invention.

Figure 5:
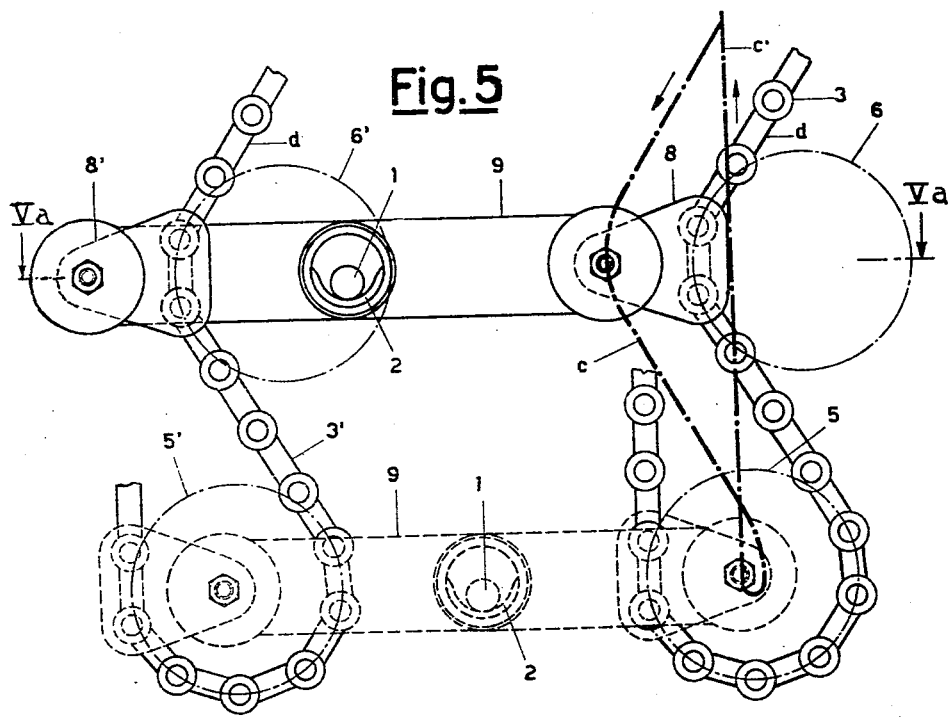

To be more precise:

FIG. 5 shows a side elevation view of an embodiment in which the cradle 2 is carried by a link rod 9 which is pivotally connected to two outwardly projecting members 8 and 8' which are joined integrally to two respective flanking chains 3 and 3' mounted on the wheels 4 and 4', 5 and 5', 6 and 6'. It is manifest that the link rod will always be moved parallel to itself (see the position indicated in broken lines in the same FIG. 5) and that, consequently, the cradle 2 will, on account of its own weight, always have its opening facing upwards.

Figure 5A:
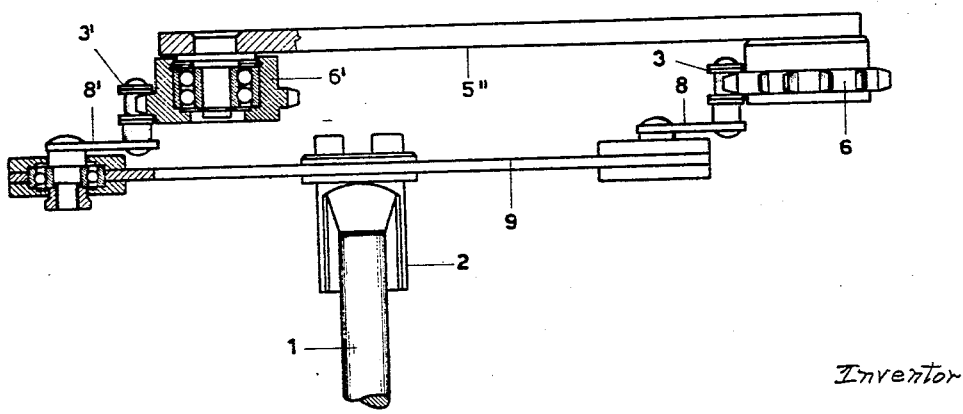

FIG. 5a shows a plan view from above of FIG. 5 at the link rod 9. In FIG. 5a there are in fact also visible the driving wheels 6—6', the rod 5" connecting them, and the link rod 9 carried by the outwardly projecting means 8—8' which are joined integrally to the chain 3—3', said link rod 9 carrying the cradle 2 for the stick 1.

FIG. 6 also relates to an embodiment in which the cradle 2 is carried at the free end 9' of a link 9 which is pivotally connected to two outwardly projecting members 8 and 8' joined to respective chains 3 and 3' which also run side by side and are mounted on the wheels 4 and 4', 5 and 5', 6 and 6'.

FIGS. 7 and 8 relate to two similar embodiments in which the link rod 9 with carrying end 9' projects outwardly bracketwise and is joined integrally to a substantially vertical rod 10. In the case of FIG. 7 this rod 10 is pivotally connected to the outwardly projecting members 8 and 8' of two chains 3 and 3' arranged one above the other and mounted respectively on the wheels 4, 5, 6 and 4', 5', 6'; this arrangement also gives the cradle 2 the desired self-intersecting motion as the rod 10 keeps substantially vertical and moves parallel to itself as it shifts laterally in a vertical plane.

In the case of FIG. 8, the rod 10 is pivotally connected at its top end to the outwardly projecting member 8 of a chain 3 mounted on the wheels 4, 5 and 6, the lower part of rod 10 being guided within a tubular sheath 11 which is pivoted at and swings about the point 12.

In this arrangement also (which is simplified in relation to those of FIGS. 5, 6 and 7 in that it employs only one chain), the cradle 2 is obliged to move according to the desired self-intersecting plane path c—c'.

At this point, however, it should be noted that the flow diagram of the technical stages through which the material passes makes it necessary in certain cases to hold up the feeding of one of the levels or of one of the horizontal carriers so as to empty said carrier; in such a case the elevator mechanism has to be disconnected while still keeping all the other parts of the machine moving; it should be remembered that there are two elevators for each level and for each carrier end.

From what has just been stated it is manifest that, in such a case, the device according to FIGS. 3 to 8 requires a few variants to enable it to provide for the separate disconnecting of each of the levels, independently from the others which must continue to work.

These variants in fact allow the device according to the invention to be shifted in relation to the sustaining and carrier line of the objects carried, in such a manner that the mobile conveying means of the device is taken away from the zone where it can engage with the objects situated on said line.

In order to achieve this object, a first solution was tried whereby each elevator was driven by its own motor and thus made reciprocally independent from the others.

It was observed immediately that the various movements could be synchronized only with very great difficulty and that it was almost impossible to make the machine function without continuously checking it; therefore a return had to be made to a single motor unit in order to avoid the aforesaid difficulties.

A second solution was then tried which did in fact employ only a single motor unit, and this solution is illustrated in FIGS. 9 to 14 and will now be described. Referring to the aforesaid FIGURES 9 to 14, the device comprises the parts hereinabove named, that is the pair of endless chains 3 and 3' mounted on the toothed wheels 4, 5, 6 and 4', 5', 6', and carrying link rod 9 which bears the cradle 2 for the sticks or canes 1. All these parts are mounted in a fixed framework 20 of substantially rectangular shape on whose side or upright members 21 there is pivotally mounted at 22 a subsidiary framework 23 formed of vertical arms 24 and a horizontal crosspiece 25.

A driven shaft 27 is mounted at the ends 26 of the arms 24 between the uprights 21, with two flanges 28 keyed on the ends thereof, which flanges, as will hereinafter be explained, function as cranks; it should be observed at this point, however, that said flanges could be replaced by proper cranks or by eccentrics, cams or the like.

A connecting rod 30 is pivoted at 39 substantially at the periphery of each flange, and a shaft 32 is pivoted at 31 at the other end of the connecting rod, there being mounted on said shaft ears 33 which are integral with the ends 26 of the arms 24 of the subsidiary framework 23.

When the flanges 28 are caused to rotate by the shaft 27 in the direction of the arrow 34, their synchronous rotation, which is limited by the stops 35 on the connecting rod 30, will obviously cause the framework 23 to swing outwards on the pivot 22 (see FIG. 12 in particular) and at right angles to the plane of the framework 20; framework 23 will, on the other hand, approach framework 20 when flange 28 rotates in the opposite direction.

As is manifest from FIGURES 9 and 10, the wheels 4 and 4' for chains 3 and 3' are mounted on the fixed framework 20, while wheels 5, 5' and 6, 6' are mounted on the swinging framework 23. (It should be noted that in FIG. 9 said wheels and chains are indicated respectively by the numerals 4, 5, 6 and 3.) Consequently when, through the described rotation of the flanges 28, framework 23 moves outwards by a certain angle normally to the plane of the framework 20, wheels 5 and 6 are also moved outwards by the same angle, this being possible because of the lateral deformability of the roller chains which allows the chains to move even on pulleys which form a certain angle with each other, provided naturally that this angle is not such as to warp the chains.

FIGURES 13 and 14 should now be considered, wherein a pair of corresponding opposite frameworks 20 are placed (as may be clearly seen from FIG. 13) at the sides of the carrier A which sustains the sticks or canes 1, in planes parallel to the motion of the carrier A (which is at right angles to the plane of the drawing). In this same FIGURE 13 the chains, indicated by the numeral 3, mounted on their respective wheels, indicated by the numerals 4, 5 and 6, are also visible; the link rods 9 and the cradles 2 are also visible. Since the frameworks 20 are mounted in specularly opposed relationship, the frameworks 23 have a similar relationship and swing towards the outside of the complex formed by frameworks 20 and carrier A.

In order to obtain the release of one of the canes or sticks 1, to which reference has already been made, it is imperative that the back and forth movements of the framework 23 be synchronized at both sides of the horizontal carrier A in order to prevent the canes or sticks 1 from being picked up on one side and not on the other, thus immediately stoping the machine through the coming into operation of the safety devices.

It follows that there must be a single synchronous driving system for the frameworks 23 so that, when it is required, both of said frameworks are retracted by the same distance $d_1$, in order to release the cane in question which is thus not picked up by the cradles.

The mechanism whereby this function is carried out is as follows: a single roller chain 39 runs on transmission pulleys 40 and is moved by means of a handle 36 with a toothed wheel 37; the two ends of the chain are in mesh with two gears 38 keyed on the shafts 27 of the two flanges 28. By turning the handle 36 the two gears 38 are caused to revolve in the appropriate direction according to whether they are on the right hand or the left hand side of the machine, and the flanges cause the frameworks 23, and consequently the cradles 2, to move away from their normal position.

Many advantages are to be obtained by the mechanism herein described, and amongst them are the following:

(a) Perfect synchronization of movements;
(b) Simplicity of mechanical design and hence reliable functioning;
(c) The use of transmission means (chains) which can be positioned advantageously to make the machine as a whole work efficiently.

Although only a few embodiments of the invention have been described and illustrated, many constructional variants are possible without departing from the legal scope of the protection afforded by the patented invention.

I claim:

1. A device for transferring objects from a first conveying means at one level moving in one direction to a second conveying means disposed at another level moving in the opposite direction with respect to said first conveying means comprising at least two substantially vertical coplanar wheel means, each having a different diameter, an endless chain means carried by said wheel means, bracket means having one end mounted on said endless chain means and extending inwardly of the area and path circumscribed by said endless chain means, said bracket means having an opposite end which is disposed to circumscribe a continuous intersecting path disposed inwardly of said endless chain means path, transferring means pivotally disposed on said opposite end of said bracket means and positioned to follow along said continuous intersecting path, means causing said transferring means to intersect the path traced by itself at a point between the levels of one of said conveying means while crossing each conveying means once during the transfer of an object from one conveying means to the other.

2. The device of claim 1 wherein said means causing said transferring means to intersect the path traced by itself is a third wheel means disposed at a vertical level between said two coplanar wheel means and vertically coplanar with said two wheel means.

References Cited in the file of this patent

UNITED STATES PATENTS

| | | |
|---|---|---|
| 2,266,170 | Currie | Dec. 16, 1941 |
| 2,682,946 | King | July 6, 1954 |
| 2,741,357 | Surico | Apr. 10, 1956 |
| 2,809,598 | Rayner | Oct. 15, 1957 |
| 2,838,163 | Archer | June 10, 1958 |